US012802595B2

(12) United States Patent
Liu

(10) Patent No.: US 12,802,595 B2
(45) Date of Patent: Nov. 17, 2026

(54) HANDICRAFT WITH ROTATING STRUCTURE

(71) Applicant: Huizhou Victory Technology Ltd, Huizhou City (CN)

(72) Inventor: Hesheng Liu, Huaihua City (CN)

(73) Assignee: HUIZHOU VICTORY TECHNOLOGY LTD., Huizhou (CN)

( * ) Notice: Subject to any disclaimer, the term of this patent is extended or adjusted under 35 U.S.C. 154(b) by 21 days.

(21) Appl. No.: 19/090,899

(22) Filed: Mar. 26, 2025

(65) Prior Publication Data

US 2026/0204187 A1 Jul. 16, 2026

(30) Foreign Application Priority Data

Jan. 14, 2025 (CN) ........................ 202510052492.7

(51) Int. Cl.
*G09F 19/00* (2006.01)
*G09F 19/08* (2006.01)

(52) U.S. Cl.
CPC ........ *G09F 19/08* (2013.01); *G09F 2019/083* (2013.01)

(58) Field of Classification Search
CPC ..... A47G 33/0809; G09F 19/00; G09F 19/08; G09F 2019/083
See application file for complete search history.

(56) References Cited

U.S. PATENT DOCUMENTS 4,852,283 A * 8/1989 Teng ........................ G09F 19/08 40/433
5,393,578 A * 2/1995 Yang .................. A47G 33/0809 428/7
6,006,461 A * 12/1999 Snyder .................. G09F 19/125 40/406
6,241,255 B1 * 6/2001 Fang ...................... A63H 13/00 40/410

FOREIGN PATENT DOCUMENTS

CN 213521703 U * 6/2021
CN 119742962 A * 4/2025
CN 119795781 A * 4/2025
CN 223764102 U * 1/2026
CN 223821359 U * 1/2026

* cited by examiner

*Primary Examiner* — Cassandra Davis
(74) *Attorney, Agent, or Firm* — Ming Jiang; OPENPTO US LLC

(57) ABSTRACT

A handicraft with a rotating structure is provided, which includes a sealing component, a stirring component, and a rotating component. The rotating component is provided in the sealing component, and liquid is provided in the sealing component. The stirring component drives the rotating component to move by stirring the liquid in the sealing component. The design of the present disclosure achieves the effect of stirring the liquid through the stirring component, and the flow of the liquid drives the rotating component to start rotating. This design is compact in structure, and the rotating component will not be unable to rotate due to external shaking and detachment. The rotating effect is also softer.

14 Claims, 2 Drawing Sheets

HANDICRAFT WITH ROTATING STRUCTURE

CROSS-REFERENCE TO RELATED APPLICATIONS

This application claims priority to Chinese Patent Application No. 202510052492.7, filed on Jan. 14, 2025, which is hereby incorporated by reference in its entirety.

TECHNICAL FIELD

The present disclosure relates to the field of handicraft technologies, and in particular, to a handicraft with a rotating structure.

BACKGROUND

With the development of the times, handicrafts have become common decorations in people's lives, with corresponding themes for different festivals and events. Some existing handicrafts are equipped with decorative elements inside, which are driven to rotate by motors or magnetic levitation, making the handicrafts more beautiful and ornamental. In the existing technology, such as CN202223222580.8 entitled with a sealed maglev rotating platform for craft rotating water lamps, a sealed maglev rotating platform for craft rotating water lamps is disclosed, which includes a reduction gearbox, a motor fixedly installed in the middle of the bottom end of the reduction gearbox seat, a reduction gearbox fixing cover threaded on the top end of the reduction gearbox seat, a reduction gearbox active output transmission ring installed on the side of the reduction gearbox fixing cover close to the motor, a first attraction magnet group set arranged in the middle of the reduction gearbox active output transmission ring, a sealing platform bracket on the side of the reduction gearbox fixing cover facing away from the motor, a fixed bracket fixed on the top end of the sealing platform bracket, and a wind turbine fixedly installed in the middle of the sealing platform bracket near the fixed bracket side. Leaf transmission teeth, one side of the sealed platform bracket near the blade transmission teeth is equipped with a blade connection shaft, and a blade gear is installed in the middle of the blade connection shaft. The side of the sealed platform bracket is equipped with a passive output transmission ring, and a second attraction magnet group is fixedly installed in the middle of the passive output transmission ring. By providing a passive output transmission ring, a first attraction magnet group, and a second attraction magnet group, the gearbox actively outputs the transmission ring to attract the first attraction magnet group, and the passive output transmission ring to attract the second attraction magnet group. Synchronization and coaxial rotation are achieved through magnetic levitation contact.

However, the above-mentioned method of driving decorative parts to rotate through magnetic levitation is prone to magnetic levitation failure due to external shaking, which results in the inability of decorative parts to rotate. Therefore, it is necessary to develop a design that can adopt updated technology, has a compact structure, will not be unable to rotate due to external shaking, and the decorative parts rotate softly and more aesthetically, in order to solve the above problems.

SUMMARY

The purpose of the present disclosure is to provide a handicraft with a rotating structure to solve the problems of poor performance, high production cost, and inability to meet entertainment needs in the background technology mentioned above.

The present disclosure provides the following technical solution: a handicraft with a rotating structure, including a sealing component, a stirring component, and a rotating component; the rotating component is provided in the sealing component, and liquid is provided in the sealing component; the stirring component drives the rotating component to move by stirring the liquid in the sealing component.

In some embodiments of the present disclosure, the rotating component includes a fixing component, a rotating carrier, and an outer decorative component; the fixing component is connected to the stirring component, the rotating carrier and the outer decorative component are fixedly connected and integrally formed, and the rotating carrier and the outer decorative component are provided on the stirring component through the fixing component.

In some embodiments of the present disclosure, the outer decorative component is provided with one or more combinations of characters, animals, or Christmas trees.

In some embodiments of the present disclosure, the stirring component includes a stirring motor component and a stirring impeller that are matched and connected to each other, and the stirring impeller stirs the liquid in the sealing component through the stirring motor component to drive the rotating component to move.

In some embodiments of the present disclosure, the stirring motor component is a brushless motor component or a brushed motor component.

In some embodiments of the present disclosure, the stirring motor component includes a rotating magnet, a stator, a rotor frame, and a rotating shaft, the rotating magnet is provided on the rotor frame, and the rotating magnet and the stirring impeller are fixedly connected or integrally formed; the rotating magnet, the rotor frame, and the rotating shaft are all provided in the sealing component; the rotating shaft is provided on the rotor frame, and the rotating component is provided on the rotating shaft or the rotor frame; the stator is provided in the rotor frame, and the stator is provided outside the sealing component.

In some embodiments of the present disclosure, the fixing component is provided on the rotating shaft or the rotor frame, the rotating carrier and the outer decorative component are fixed by the fixing component, the stirring component drives the rotating carrier and the outer decorative component to move by stirring the liquid in the sealing component.

In some embodiments of the present disclosure, the fixing component includes a lower fixed part, a rotating disk, and a support platform, the lower fixed part is fixedly or rotatably connected to the rotating shaft or the rotor frame, the rotating disk is provided between the lower fixed part and the support platform, the rotating disk is fixedly connected to the rotating carrier, the support platform is provided above the rotating disk, and the support platform is fixedly connected to the lower fixed part.

In some embodiments of the present disclosure, a diameter of the support platform is larger than an inner diameter of the rotating disk.

In some embodiments of the present disclosure, the support platform is provided with an inner decorative piece, and the inner decorative piece is fixedly connected to the support platform.

In some embodiments of the present disclosure, the inner decorative piece is Christmas trees or snowman.

In some embodiments of the present disclosure, the sealing component includes a container body and a container seat, the container body and the container seat form a sealed cavity, the sealed cavity formed by the container body and the container seat is filled with liquid.

In some embodiments of the present disclosure, the rotor frame and the container seat are fixedly connected or integrally formed.

In some embodiments of the present disclosure, a bottom of the container seat is provided with a motor fixing part, and the stator is fixedly connected to the container seat through the motor fixing part.

In some embodiments of the present disclosure, a liquid injection port and a liquid sealing plug are provided on the container seat.

In some embodiments of the present disclosure, the liquid is a mixture of one or more combinations of water, oil, and liquid pigment.

Compared with the existing technology, the beneficial effects of the present disclosure are as follows.

The handicraft with a rotating structure of the present disclosure includes a sealing component, a stirring component, and a rotating component. Liquid is provided in the sealing component, the stirring component is provided in the sealing component, the stirring component is provided on the motor component, the rotating component is provided in the sealing component, and the rotating component is provided on the stirring component. The stirring component stirs the liquid in the sealing component, and the rotating component is rotated through the flow of the liquid. The stirring component is used to achieve the effect of stirring the liquid, and the flow of the liquid drives the rotating component to start rotating. This design is compact in structure, and the rotating component will not be unable to rotate due to external shaking and detachment. The rotating effect is also softer and more beautiful.

In the handicraft with a rotating structure of the present disclosure, the rotating component includes a fixing component, a rotating carrier, and an outer decorative component. The fixing component is connected to the motor component, and the rotating carrier is fixedly connected to the outer decorative component. The rotating carrier and the outer decorative component are provided on the stirring component through the fixing component. By providing the fixing component, the rotating carrier, the external decorative component, and the motor component can be rotatably connected, rendering the external decorative component less likely to fall off and able to rotate independently, thereby meeting the diverse needs of the market.

In the handicraft with a rotating structure of the present disclosure, the stirring motor component includes a rotating magnet, a stator, a rotor frame, and a rotating shaft. The rotating magnet is provided on the rotor frame and inside the container seat, the rotating shaft is provided on the rotor frame, the stator is provided in the rotor frame and provided outside the container seat. By separating the stator and rotating magnet, and setting them separately inside and outside the container seat, the stirring impeller stirs the liquid inside the sealing component through a rotation of the rotating magnet. The stirring effect can be achieved through the container seat, which renders a connection between the stirring component and the rotating magnet to be more stable and less likely to fall off.

In the handicraft with a rotating structure of the present disclosure, the sealing component includes a container body and a container seat. The container body and the container seat form a sealed cavity, and the liquid is provided in the sealed cavity formed by the container body and the container seat. A liquid injection port and a liquid sealing plug are provided on the container seat. The structural design of the liquid injection port renders it easier and faster to inject liquid into the product; the design of the sealing chamber and liquid sealing plug ensures that the product has good sealing performance and is not prone to liquid leakage.

In the handicraft with a rotating structure of the present disclosure, the fixing component includes a lower fixed part, a fixed disk, and a support platform. The lower fixed part is fixedly connected to or rotatably connected to the motor component, and the fixed disk is fixedly connected to the rotating carrier. The support platform is provided on the fixed disk and fixedly connected to the lower fixed part. An internal decorative piece is provided on the support platform, which is fixedly connected to the support platform. When the lower fixed part and the motor component are fixedly connected, the inner decorative piece will not rotate with the flow of liquid. When the lower fixed part and the motor component are rotatably connected, the inner decorative piece will rotate with the flow of liquid. Through this design, the product has diversity and meets market demand.

BRIEF DESCRIPTION OF DRAWINGS

In order to provide a clearer explanation of the embodiments or technical solutions in the present application or existing technology, a brief introduction will be given to the accompanying drawings required for the embodiments or existing technology description. It is obvious that the accompanying drawings described below are only some embodiments of the present application. For those skilled in the art, other drawings can be obtained based on these drawings without requiring creative work.

Figure 1:
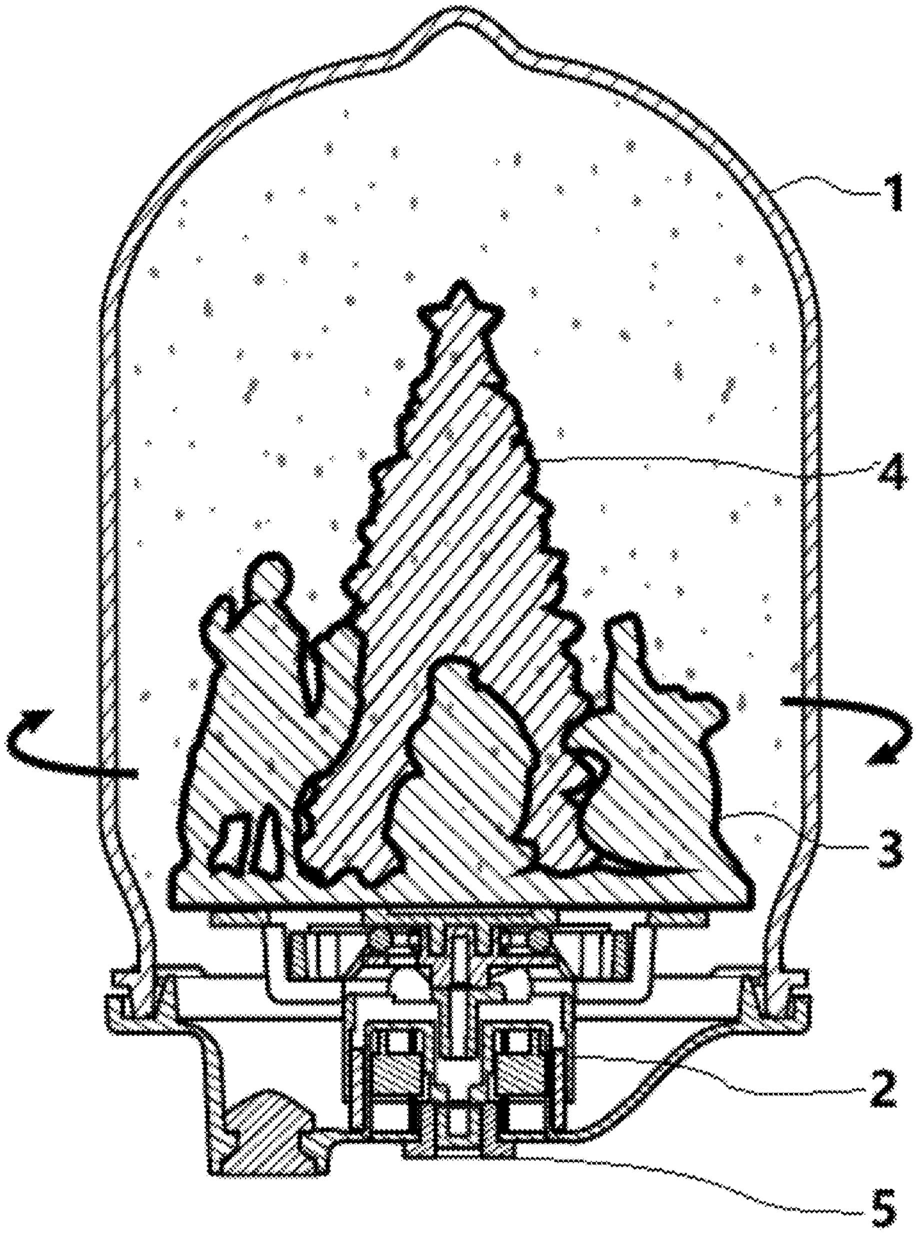
FIG. 1 is a semi-sectional schematic diagram of a handicraft with a rotating structure according to the present disclosure.

Numeral reference: 1—sealing component; 11—container body; 12—container seat; 121—liquid injection port; 122—liquid sealing plug; 2—stirring component; 21—stirring motor component; 211—rotating magnet; 212—stator; 213—rotor frame; 214—rotating shaft; 22—stirring impeller; 3—rotating component; 31—fixing component; 311—lower fixed part; 312—rotating disk; 313—support platform; 32—rotating carrier; 33—outer decorative component; 4—inner decorative piece; 5—motor fixing part.

DESCRIPTION OF EMBODIMENTS

The following provides a detailed description of the embodiments of the present application, examples of which are shown in the accompanying drawings, where the same or similar reference numerals from beginning to end represent the same or similar elements or elements with the same or similar functions. The embodiments described below with reference to the accompanying drawings are exemplary and are only used to explain the present application, and should not be construed as limiting the present application.

In a description of this application, it should be understood that terms "first" and "second" are only used for a descriptive purpose and cannot be understood as indicating or implying relative importance or implying the number of technical features indicated. Thus, the features limited to "first" and "second" may explicitly or implicitly include one or more of the aforementioned features. In the description of this application, the meaning of "multiple" refers to two or more, unless otherwise specifically limited.

In the description of this application, it should be noted that unless otherwise specified and limited, terms "installation" and "connection" should be broadly understood, for example, it can be a fixed connection, a detachable connection, or an integrated connection; it can be a mechanical connection, an electrical connection, or communication with each other; it can be directly connected or indirectly connected through an intermediate medium, and it can be a connection within two components or an interaction relationship between two components. For those skilled in the art, the specific meanings of the above terms in this application can be understood according to a specific situation.

In the description of this application, it should be understood that terms "up" "down", "side", "front", "back", etc. indicate orientation or position relationships based on installation, only for the convenience of describing this application and simplifying the description, and do not indicate or imply that the device or component referred to must have a specific orientation, be constructed and operated in a specific orientation, and therefore cannot be understood as a limitation of this application.

In the description of this application, it should be noted that term "and/or" is only a description of the association relationship between related objects, indicating that there can be three types of relationships, such as A and/or B, which can represent: the existence of A alone, the existence of A and B at the same time, and the existence of B alone.

It should be noted that in the embodiments of the present application, the same reference numerals are used to represent the same components or parts. For the same parts in the embodiments of the present application, only one part or component may be marked with a reference numeral in the figure. It should be understood that for other identical parts or components, the reference numerals are also applicable.

Besides that, in this application, the technical features described in an open manner include both closed technical solutions composed of the listed features and open technical solutions containing the listed features.

In order to further understand the disclosure, characteristics, and efficacy of the present application, the following embodiments are listed and explained in detail with the accompanying drawings.

Figure 2:
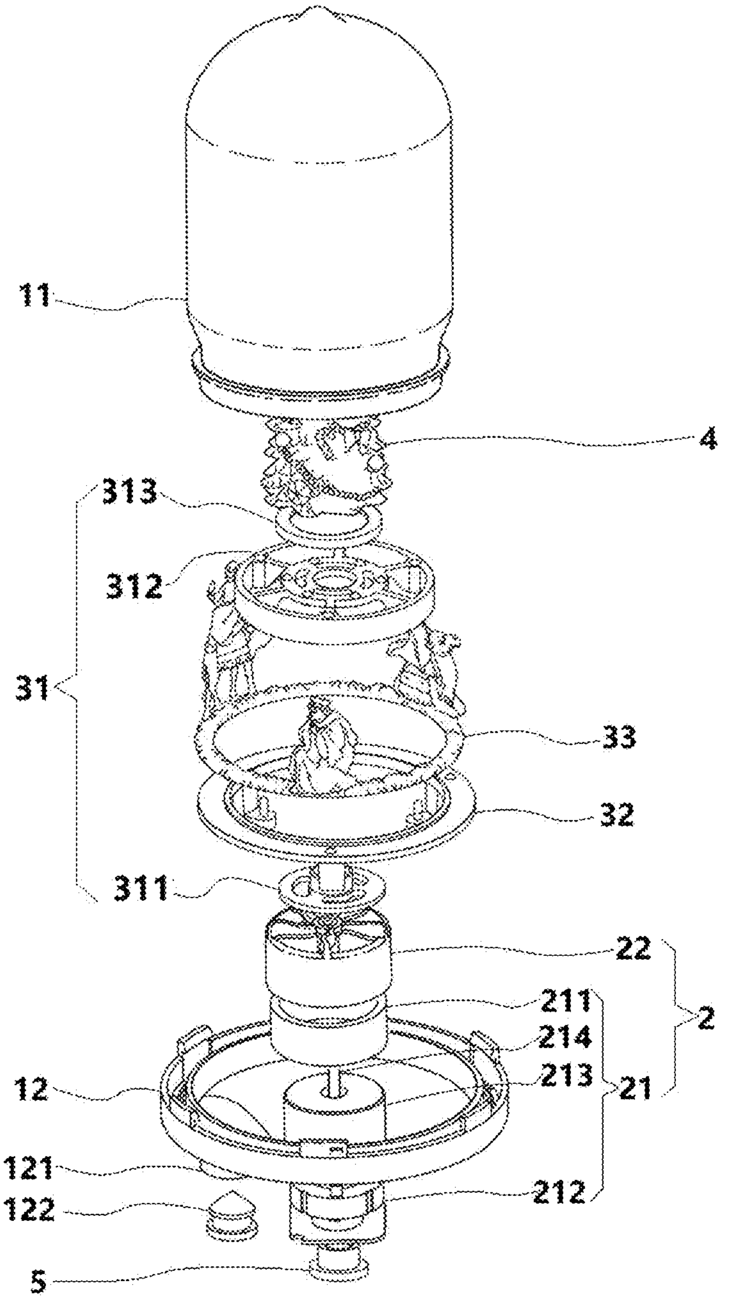
FIG. 2 is an exploded schematic diagram of the handicraft with a rotating structure according to the present disclosure.

As shown in FIGS. 1-2, a handicraft with a rotating structure includes a sealing component 1, a stirring component 2, and a rotating component 3. The rotating component 3 is provided in the sealing component 1, and there is liquid inside the sealing component 1. The stirring component 2 drives the rotating component 3 to move by stirring the liquid in the sealing component 1. In this embodiment, the stirring component is configured to achieve the effect of stirring the liquid, and the flow of the liquid drives the rotating component to start rotating. This design is compact in structure, and the rotating component will not be unable to rotate due to external shaking and detachment. The rotating effect is also softer and more beautiful. Of course, the above structural design is not limited to this and can also be other structures that serve the same purpose.

In an implementation mode, the rotating component 3 includes a fixing component 31, a rotating carrier 32, and an outer decorative component 33. The fixing component 31 is connected to the stirring component 2, and the rotating carrier 32 and the outer decorative component 33 are fixedly connected and integrally formed. The rotating carrier 32 and the outer decorative component 33 are provided on the stirring component 2 through the fixing component 31. In this embodiment, by providing with the fixing component, the rotating carrier and the outer decorative component can be rotatably connected to the motor component, rendering the outer decorative component less likely to fall off and able to rotate independently. Of course, the above structural design is not limited to this and can also be other structures that serve the same purpose.

In an implementation mode, the outer decorative component 33 is provided with one or more combinations of characters, animals, or Christmas trees. In this embodiment, there are several figures on the outer decorative component. Of course, the shape of the outer decorative component is not limited to this, and can also be other decorative shapes and structures.

In an implementation mode, the stirring component 2 includes a stirring motor component 21 and a stirring impeller 22 that are matched and connected to each other. The stirring impeller 22 drives the rotating component 3 to move by stirring the liquid in the sealing component 1 through the stirring motor component 21. In this embodiment, the stirring effect of stirring the liquid is achieved by driving the stirring impeller through the stirring motor component. Of course, the above structural design is not limited to this and can also be other structural designs that serve the same purpose.

In an implementation mode, the stirring motor component 21 is a brushless motor component or a brushed motor component. In this embodiment, the stirring motor component is a brushless motor, which has a longer service life. Of course, the type of motor is not limited to this and can also be other motors that perform the same function.

In an implementation mode, the stirring motor component 21 includes a rotating magnet 211, a stator 212, a rotor frame 213, and a rotating shaft 214. The rotating magnet 211 is provided on the rotor frame 213, and the rotating magnet 211 is fixedly connected or integrally formed with the stirring impeller 22. The rotating magnet 211, the rotor frame 213, and the rotating shaft 214 are all provided within the sealing component 1, with the rotating shaft 214 provided on the rotor frame 213, the rotating component 3 provided on the rotating shaft 214 or the rotor frame 213, the stator 212 provided within the rotor frame 213, and the stator 212 provided outside the sealing component 1. When the rotating magnet and the stirring impeller are integrally formed, the stirring impeller also belongs to the stirring motor component. In this embodiment, by separating the stator and the rotating magnet, and setting them separately inside and outside the container seat, the stirring component stirs the liquid inside the sealing component through the rotation of the rotating magnet. The stirring effect of the liquid can be achieved through the sealing component, rendering a connection between the stirring component and the rotating magnet more stable and less likely to fall off. Of course, the above structural design is not limited to this and can also be other structural designs that serve the same purpose.

In an implementation mode, the fixing component 31 is provided on the rotating shaft 214 or the rotor frame 213, and the rotating carrier 32 and the outer decorative component 33 are fixed by the fixing component 31. The stirring component 2 drives the rotating carrier 32 and the outer decorative component 33 to move by stirring the liquid in the sealing component 1. In this embodiment, the fixing component is provided on the rotating shaft, and through this design, the rotating carrier and outer decorative component are not easily detached. Of course, the above structural design is not limited to this and can also be other structural designs that serve the same purpose.

In an implementation mode, the fixing component 31 includes a lower fixed part 311, a rotating disk 312, and a support platform 313. The lower fixed part 311 is fixedly or rotatably connected to the rotating shaft 214 or the rotor frame 213. The rotating disk 312 is provided between the lower fixed part 311 and the support platform 313, and is fixedly connected to the rotating carrier 32. The support platform 313 is provided above the rotating disk 312, and the support platform 313 is fixedly connected to the lower fixed part 311. In this embodiment, the lower fixed part is fixedly connected to the rotating shaft, so the support platform will not rotate with the flow of liquid. Of course, the above structural design is not limited to this and can also be other structures that serve the same purpose.

In an implementation mode, a diameter of the support platform 313 is larger than an inner diameter of the rotating disk 312. In this embodiment, through the above structural design, the support platform plays a limiting role, thereby effectively restricting the rotating carrier in a certain position and preventing it from moving up and down. Of course, the above structural design is not limited to this and can also be other structures that serve the same purpose.

In an implementation mode, the support platform 313 is provided with an inner decorative piece 4, which is fixedly connected to the support platform 313. In this embodiment, the lower fixed part is fixedly connected to the rotating shaft, so the inner decorative piece on the support platform will not rotate with the flow of liquid. Of course, the above structural design is not limited to this and can also be other structures that serve the same purpose.

In an implementation mode, the interior decoration piece 4 is a Christmas tree or snowman. In this embodiment, the inner decorative piece is a Christmas tree. Of course, the shape of the inner decorative piece is not limited to this and can also be other decorative structures that serve a decorative purpose.

In an implementation mode, the sealing component 1 includes a container body 11 and a container seat 12. The container body 11 and the container seat 12 form a sealed cavity, and the sealed cavity formed by the container body 11 and the container seat 12 is filled with liquid. In this embodiment, the container body and the container seat form the sealed cavity, and the sealed cavity is filled with liquid, rendering the product more aesthetically pleasing. Of course, the above structural design is not limited to this and can also be other structural designs that serve the same purpose.

In an implementation mode, in this embodiment, the rotor frame 213 and the container seat 12 are fixedly connected or integrally formed. The rotor frame and the container seat are integrally formed, and the container seat and the rotor frame are integrally formed. The container and the outside of the rotor frame form a cavity, and the stator component is provided in the cavity, provided outside the container seat. Through this structural design, on the one hand, it facilitates the installation of the stator component, and on the other hand, when the stator component is damaged, only the stator component needs to be replaced, without replacing the entire brushless motor component. Of course, the above structural design is not limited to this and can also be other structures that serve the same purpose.

In an implementation mode, a bottom of the container seat 12 is provided with a motor fixing part 5, and the stator 212 is fixedly connected to the container seat 12 through the motor fixing part 5. In this embodiment, the motor fixing component is a T-shaped plug, which fixes the stator component inside the rotor frame through the motor fixing component, rendering the stator component less likely to fall off. Of course, the shape of the motor fixing component is not limited to this, and can be other structures or shapes that serve the same purpose.

In an implementation mode, a liquid injection port 121 and a liquid sealing plug 122 are provided on the container seat 12. In this embodiment, the liquid injection port is designed to make it more convenient to inject liquid, and the liquid sealing plug is used to prevent liquid leakage and improve sealing performance. Of course, the shape of the motor fixing component is not limited to this, and can be other structures or shapes that serve the same purpose.

In an implementation mode, the liquid is a mixture of one or more combinations of water, oil, and liquid pigments. In this embodiment, the liquid is water, and by injecting water into the sealing component, the product can be made more aesthetically pleasing. Of course, the type of liquid is not limited to this and can be other liquids that have the same effect.

In an implementation mode, the fixing component 31 includes a lower fixed part 311, a rotating disk 312, and a support platform 313. The lower fixed part 311 is fixedly or rotatably connected to the rotating shaft 214 or the rotor frame 213. The rotating disk 312 is provided between the lower fixed part 311 and the support platform 313, and is fixedly connected to the rotating carrier 32. The support platform 313 is provided above the rotating disk 312, and the support platform 313 is fixedly connected to the lower fixed part 311. In this embodiment, the lower fixed part is connected to the rotating shaft, so the support platform is rotated with the flow of liquid. Of course, the above structural design is not limited to this and can also be other structures that serve the same purpose.

In an implementation mode, the support platform 313 is provided with an inner decorative piece 4, which is fixedly connected to the support platform 313. In this embodiment, the lower fixed piece is rotatably connected to the rotating shaft, so the inner decorative piece on the support platform is rotated with the flow of liquid. Of course, the above structural design is not limited to this and can also be other structures that serve the same purpose.

Working principle: after the stirring motor component is powered on, the stirring motor component drives the stirring component to stir the liquid in the sealing component, thereby achieving the stirring effect. The rotating component includes a fixing component, a rotating carrier, and an outer decorative component. The fixing component can connect the rotating carrier and the outer decorative component to the rotating shaft and be provided on the stirring component. The fixing component includes a lower fixed part, a fixed disk, and a support platform. On the support platform, the lower fixed part is fixedly connected to the rotating shaft. The support platform has a limiting effect on the rotating carrier and the outer decorative component, thereby preventing them from moving up and down. The stirring effect of liquid is achieved by driving the stirring impeller through the stirring motor component. The flow of the liquid drives the rotating carrier and the outer decorative component to start rotating.

When the fixed part and motor component are fixedly connected, the support platform and the inner decorative piece will not rotate with the flow of liquid; when the fixed part and motor component are rotatably connected, the support platform and the inner decorative piece are rotated with the flow of liquid.

The various technical features of the above embodiments can be combined in any way. In order to render the description concise, not all possible combinations of the various technical features in the above embodiments have been described. However, as long as there is no contradiction in the combination of these technical features, they should be considered within the scope of this specification.

The above embodiments only express some embodiments of the present disclosure, and their descriptions are more specific and detailed, but should not be understood by limiting the scope of the present application. It should be noted that for those skilled in the art, several modifications and improvements can be made without departing from the inventive concept, which are within the protection scope of the present disclosure. Therefore, the protection scope of the present disclosure should be based on the appended claims.

What is claimed is:

1. A handicraft with a rotating structure, comprising: a sealing component, a stirring component, and a rotating component;

the rotating component is provided in the sealing component, and liquid is provided in the sealing component;

the stirring component drives the rotating component to move by stirring the liquid in the sealing component;

wherein the stirring component comprises a stirring motor component and a stirring impeller that are is matched and connected to each other;

wherein the stirring motor component comprises a rotating magnet, a stator, a rotor frame, and a rotating shaft, the rotating magnet is provided on the rotor frame, and the rotating magnet and the stirring impeller are fixedly connected or integrally formed, the rotating magnet, the rotor frame, and the rotating shaft are all provided in the sealing component, the rotating shaft is provided on the rotor frame, and the rotating component is provided on the rotating shaft or the rotor frame, the stator is provided in the rotor frame, and the stator is provided outside the sealing component.

2. The handicraft with a rotating structure according to claim 1, wherein the rotating component comprises a fixing component, a rotating carrier, and an outer decorative component;

the fixing component is connected to the stirring component, the rotating carrier and the outer decorative component are fixedly connected and integrally formed, and the rotating carrier and the outer decorative component are provided on the stirring component through the fixing component.

3. The handicraft with a rotating structure according to claim 2, wherein the fixing component is provided on the rotating shaft or the rotor frame, the rotating carrier and the outer decorative component are fixed by the fixing component, the stirring component drives the rotating carrier and the outer decorative component to move by stirring the liquid in the sealing component.

4. The handicraft with a rotating structure according to claim 2, wherein the fixing component comprises a lower fixed part, a rotating disk, and a support platform, the lower fixed part is fixedly or rotatably connected to the rotating shaft or the rotor frame, the rotating disk is provided between the lower fixed part and the support platform, the rotating disk is fixedly connected to the rotating carrier, the support platform is provided above the rotating disk, and the support platform is fixedly connected to the lower fixed part.

5. The handicraft with a rotating structure according to claim 4, wherein a diameter of the support platform is larger than an inner diameter of the rotating disk.

6. The handicraft with a rotating structure according to claim 5, wherein the support platform is provided with an inner decorative piece, and the inner decorative piece is fixedly connected to the support platform.

7. The handicraft with a rotating structure according to claim 6, wherein the sealing component comprises a container body and a container seat, the container body and the container seat form a sealed cavity, the sealed cavity formed by the container body and the container seat is filled with liquid.

8. The handicraft with a rotating structure according to claim 7, wherein the rotor frame and the container seat are fixedly connected or integrally formed.

9. The handicraft with a rotating structure according to claim 8, wherein a bottom of the container seat is provided with a motor fixing part, and the stator is fixedly connected to the container seat through the motor fixing part.

10. The handicraft with a rotating structure according to claim 8, wherein a liquid injection port and a liquid sealing plug are provided on the container seat.

11. The handicraft with a rotating structure according to claim 10, wherein the liquid is a mixture of one or more combinations of water, oil, and liquid pigment.

12. The handicraft with a rotating structure according to claim 2, wherein the outer decorative component is provided with one or more combinations of characters, animals, or Christmas trees.

13. The handicraft with a rotating structure according to claim 1, wherein the stirring impeller stirs the liquid in the sealing component through the stirring motor component to drive the rotating component to move.

14. The handicraft with a rotating structure according to claim 13, wherein the stirring motor component is a brushless motor component or a brushed motor component.

* * * * *